(12) United States Patent
Oilund

(10) Patent No.: US 6,516,841 B1
(45) Date of Patent: Feb. 11, 2003

(54) TREE FELLING AND SHAPING APPARATUS

(76) Inventor: Lester D. Oilund, 9862 Prairie Road, Grande Prairie, Alberta (CA), T8V 3R9

( * ) Notice: Subject to any disclaimer, the term of this patent is extended or adjusted under 35 U.S.C. 154(b) by 0 days.

(21) Appl. No.: 09/915,327

(22) Filed: Jul. 27, 2001

(51) Int. Cl.$^7$ ............................................... A01G 23/08
(52) U.S. Cl. ...................... 144/4.1; 144/34.1; 144/336; 414/695.7; 414/739
(58) Field of Search ............................ 83/928; 30/379, 30/379.3; 144/24.13, 4.1, 34.1, 34.5, 336, 338, 339, 335; 414/680, 694, 695, 695.5, 695.7, 695.8, 739

(56) References Cited

U.S. PATENT DOCUMENTS

| | | | | |
|---|---|---|---|---|
| 3,542,099 A | * | 11/1970 | Gibson | 144/338 |
| 3,590,760 A | * | 7/1971 | Boyd | 144/338 |
| 3,735,786 A | * | 5/1973 | Vit | 144/338 |
| 3,868,982 A | * | 3/1975 | Kurelek et al. | 144/338 |
| 4,800,936 A | | 1/1989 | Pomies et al. | 144/4.1 |
| 5,101,872 A | * | 4/1992 | Scheuren | 144/4.1 |
| 5,291,926 A | | 3/1994 | Jansson | 144/34 |
| 5,709,254 A | | 1/1998 | Argue | 144/34.1 |
| 5,727,610 A | | 3/1998 | Isley | 144/4.1 |
| 5,975,166 A | * | 11/1999 | MacLennan | 144/4.1 |

* cited by examiner

*Primary Examiner*—W. Donald Bray
(74) *Attorney, Agent, or Firm*—Wayne H. Yan; Ogilvy Renault

(57) ABSTRACT

A tree felling and shaping apparatus is provided with a fully powered and controllable link system which links a tree processor head to a boom that is in turn mounted to a vehicle. The link system includes two powered pivoting joints and a rotary coupling of up to 360° disposed therebetween. Such a combination provides a great convenience for the manipulation of the tree felling and shaping apparatus, not only permitting a maximum angular adjustment of the tree processor head for all directional orientations whether the head is in an upright position for felling trees or the head is in a recumbent position for processing trees, but also performing a universal joint function to freely suspend the tree processor head from the boom without using a conventional uncontrollable universal joint. The present invention improves maneuverability of the tree felling and shaping machines and thereby increases work efficiency.

13 Claims, 5 Drawing Sheets

TREE FELLING AND SHAPING APPARATUS

THE FIELD OF THE INVENTION

This invention relates to an improved tree felling and shaping apparatus. The invention more particularly relates to an improved tree felling and shaping apparatus of the type that can be rotated about a vertical axis regardless of the process in which the apparatus operates for tree felling or tree shaping.

BACKGROUND OF THE INVENTION

Tree felling machines can be broken into two categories, feller/bunchers and feller/processors. Feller/bunchers are use for felling and piling trees. A feller/buncher has a boom with a head mounted at the end of the boom. The head has arms or other means of gripping a tree and a saw for cutting the tree at the base. After the tree has been cut, the cut tree can be processed by another machine before being shipped to its ultimate destination. An example of feller/bunchers is described in U.S. Pat. No. 5,291,926, entitled CUTTING AND SAWING UNIT PROVIDED WITH A TIMBER HANDLING ARRANGEMENT, issued to Jansson on Mar. 8, 1994.

Feller/processors, or tree felling and shaping machines are machines which can both cut trees and process the cut trees. Generally, a tree felling and shaping machine has a tree processor head which includes a central post, a cutting device at the bottom of the central post, and gripper and stripping means attached to the central post. The tree felling and shaping machine generally has a boom mounted to a vehicle and the tree processor head is typically mounted to the boom with a joint link system which has at least two degrees of freedom. The head can be tilted toward, or away from the machine about a first axis transverse to the boom. The head may also be tilted side to side about a second transverse axis, which is generally longitudinal to the boom when the head is upright, or may be pivoted about a second transverse axis which is at an angle from the first axis. These two degrees of freedom allow the head to be aligned with a tree that is not perfectly vertical. After the tree has been cut the head can be tilted about the first axis to move relative to the bottom of the machine to lay trees down transversely to the bottom for processing. During the processing period the tree processor head is in a generally horizontal position and must be freely suspended on the boom or "float" about the horizontal axis perpendicular to the tree while the tree is being shaped.

Examples of such tree felling and shaping machines are described as prior art (referring to FIGS. 2A and 2B) in U.S. Pat. No. 5,727,610, entitled COMBINED TREE FELLER AND PROCESSOR, issued to Isley on Mar. 17, 1998. The prior art feller/processor uses a universal joint to suspend the processor head from a boom in order to allow the processor head to pivot freely about a longitudinal axis and a transverse axis. However, as pointed out by Isley, mounting a processor head to a boom in a manner which provides the necessary "floating" action during processing generally precludes the use of a high speed continuously rotating saw for tree cutting because such a mounting would be incapable of controlling the saw under the action of the large gyroscopic forces. Furthermore, the un-powered universal joint is not controllable, thereby reducing the maneuverability of the feller/processor which is especially required when the feller/processor is used to pile and handle the processed trees.

Another example of tree feller/processors is described in U.S. Pat. No. 4,800,936, entitled MACHINE FOR FELLING AND SHAPING TREES, issued to Pomies et al. on Jan. 31, 1989. Pomies et al. describe a link system having an un-powered pivoting joint which provides an additional degree of angular freedom while the tree processor head is in a recumbent position for shaping trees, but is disabled while the tree processor head is in an upright position for felling trees. The un-powered pivoting joint reduces the maneuverability of the processor head in the recumbent position. Furthermore, this link system can not provide any angular adjustment of the processor head in the upright position for a selected angle to approach a target tree.

Efforts have been made to improve tree felling and shaping machines, particularly to improve the joint link system which operatively links the tree processor head and the boom in order to make the machine more maneuverable, thereby increasing the work efficiency of the tree felling and shaping machine, and reducing operation costs. One example of such efforts can also be found in U.S. Pat. No. 5,727,610 which suggests a fully powered and controllable link system. This link system however, compromises a wide selection of approaching angles of the processor head to a target tree to be cut because of limited rotational adjustment about a vertical axis when the head is in the upright position for a tree felling process so that more boom and vehicle movement is needed to compensate for this limitation.

Another example of such efforts can be found in U.S. Pat. No. 5,709,254 entitled TREE HARVESTING APPARATUS, issued to Argue on Jan. 20, 1998. A fully powered and controllable link system described by Argue includes a helical spline for permitting rotational movement of a harvesting head about a central vertical axis thereof. This provides enhanced maneuverability of the head to prevent damage to saplings or other immature timber. However, the helical spline provides limited rotational movement of the head only through a 220° arc. Therefore, an all direction approach of the head to a target tree to be cut, cannot be achieved.

The industry continues to search for better tree felling and cutting machine designs, particularly for one which provides the capability of angular adjustment of the tree processor head in all directions of approach to a target tree during a tree felling process, and in all orientations during the tree shaping process.

SUMMARY OF THE INVENTION

It is one object of the present invention to provide an improved tree felling and shaping system.

It is another object of the present invention to provide a tree felling and shaping apparatus which is convenient to manipulate.

It is a further object of the present invention to provide a link system of a tree felling and shaping apparatus which is adapted for maximum angular adjustment about a vertical axis, thereby permitting a processor head of the apparatus to approach a target tree from any direction for cutting and de-limbing the target tree.

The present invention is directed to a fully powered and controllable link system for operatively linking a boom and a tree processor. The tree processor includes a central elongate support member and generally has an upright position in which the central elongate support member is substantially vertical for felling a tree, and a recumbent position in which the central elongate support member is substantially horizontal for shaping the tree. The link system defines first, second and third axes. The first axis is generally horizontal and a first member is adapted to be pivotally mounted to a free end of the boom for pivoting about the first axis. A first axis power actuator is attached to the first member and adapted to be connected to the boom for tilting the first member about the first axis. The second axis is perpendicular to the first axis, and a generally elongate second member is mounted at a first end thereof to the first member directly by a rotary coupling, thereby permitting the second member to rotate more than 300°, but restraining other movement thereof, relative to the first member about the second axis regardless of the upright or recumbent processor head position. A second axis power actuator is attached to the rotary coupling for actuating the rotary movement. The third axis is perpendicular to the second axis and is adapted to extend side to side with respect to the processor head and to be perpendicular to the central elongate support member of the processor head. The second member at a second end thereof is adapted to be pivotally mounted to the central elongate support member of the processor head for pivoting about the third axis. A third axis power actuator is attached to the second member and is adapted to be connected to the central elongate support member for pivoting the central elongate support member about the third axis between the upright and recumbent positions.

The present invention is also directed to a tree felling and shaping apparatus of a type having a tree processor head which includes a central elongate support member, a cutting device at a bottom of the central elongate support member, and gripper and stripping means attached to the central elongate support member. The processor head generally has a first position in which the central elongate support member is substantially vertical for felling a tree, and a recumbent position in which the central elongate support member is substantially horizontal for shaping the tree. The apparatus further includes a boom having an end mounted to a vehicle and a free end, a and a first member pivotally mounted to the free end of the boom for pivoting about a first generally horizontal axis. A first axis power actuator is positioned to link the boom and the first member for tilting the first member about the first axis. The apparatus defines a second axis perpendicular to the first axis and includes a generally elongate second member mounted at a first end thereof to the first member by a rotary coupling, permitting the second member to rotate more than 300°, preferably 360°, but restraining other movement thereof, relative to the first member about the second axis, regardless of the first or second processor head position. A second axis power actuator is attached to a rotary coupling for actuating the rotary movement. The apparatus defines a third axis of the apparatus which is perpendicular to both the second axis and the central elongate support member of the processor head, and the central elongate support member is pivotally mounted to a second end of the second member for pivoting about the third axis. A third axis power actuator is positioned to link the second member and the central elongate support member for pivoting the central elongate support member about the third axis between the substantially vertical and horizontal positions.

With such a fully powered and controllabe link system, the processor head is conveniently manipulated between its upright and recumbent positions for either tree felling or shaping processes by actuating the third axis power actuator to thereby pivot the central elongate support member of the processor head while the second axis of the apparatus is substantially maintained in a vertical position. Thus, actuating the second axis power actuation will rotate the processor header about the second axis which is in a substantially vertical position, regardless of the processor head position. This configuration provides a maximum angular adjustment to the processor head for approach to a target tree to be cut, from any direction when the processor head is in its upright position, and permits shaping and de-limbing of the cut tree in any direction when the processor head is in its substantially horizontal position.

The generally elongate second member of the tree felling and shaping apparatus according to the present invention comprises a configuration permitting the processor head to be located below the rotary coupling when the central elongate support member thereof is in the substantially vertical position. The pivoting and the rotary links of the tree felling and shaping apparatus are preferably arranged in a manner such that under the force of gravity alone the first member with all parts supported thereby, is adapted to be freely suspended from the boom when the processor head without a load is maintained in a first position. This feature advantageously allows convenient manipulation of the apparatus when the processor head is to be aligned with a target tree to be cut.

The fully powered and controllable link system not only provides maximum angular adjustment of the tree processor head for all directional orientations whether the head is in a recumbent or an upright position by also advantageously performs a universal joint function to freely suspend the tree processor head from the boom without using a conventional uncontrollable universal joint. This feature will be better understood with reference to a preferred embodiment of the present invention described hereinafter.

Other advantages and features of the present invention will also be better understood with reference to a preferred embodiment of the present invention described hereinafter.

BRIEF DESCRIPTION OF THE DRAWINGS

Having thus generally described the nature of the present invention, reference will now be made by way of illustration only to the accompanying drawings, showing the preferred embodiments thereof, in which.

DETAILED DESCRIPTION OF THE PREFERRED EMBODIMENT

Referring to the drawings, particularly to FIGS. 1 through 4, a tree felling and shaping apparatus generally indicated at numeral 10 includes a tree processor head 12. The tree processor head 12 includes a central beam 14 which carries two pairs of gripping arms 16 and 18 for gripping a tree and a cut-off saw 20 attached to the bottom of the beam 14 for cutting the tree. The beam 14 further supports processing means such as a set of de-limbing knives (not shown) for processing the tree, and a tree feeder comprising a pair of feed rollers 22 for moving the tree along relative to the de-limbing knives after the tree has been cut. The de-limbing knives may comprise sharpened edges on the gripping arms 16 and 18.

The tree felling and shaping apparatus 10 further includes a fully powered and controllable link system 24 to operatively connect the tree processor head 12 to a boom 26 which in turn is operatively mounted to a vehicle (not shown).

Figure 1:
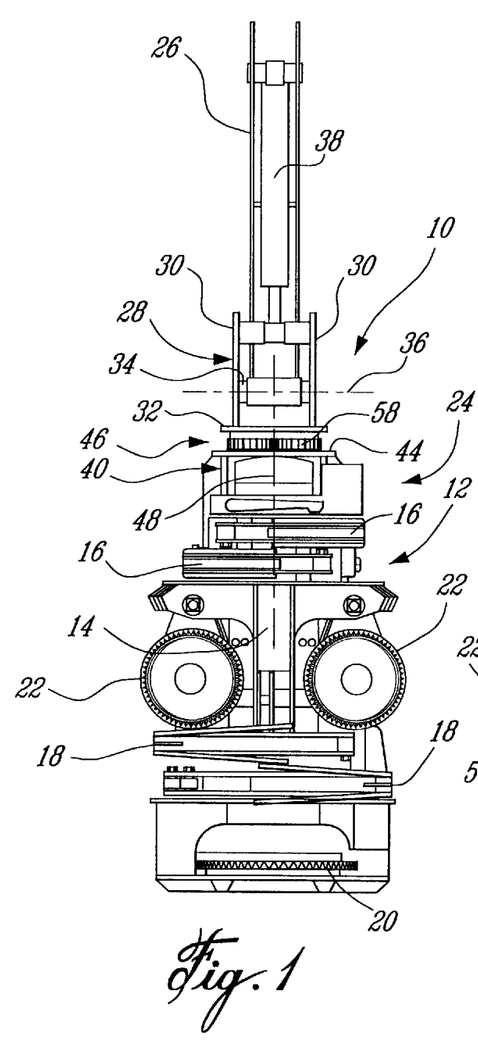
FIG. 1. is a front elevational view of a tree felling and shaping apparatus according to one embodiment of the present invention.
Figure 2:
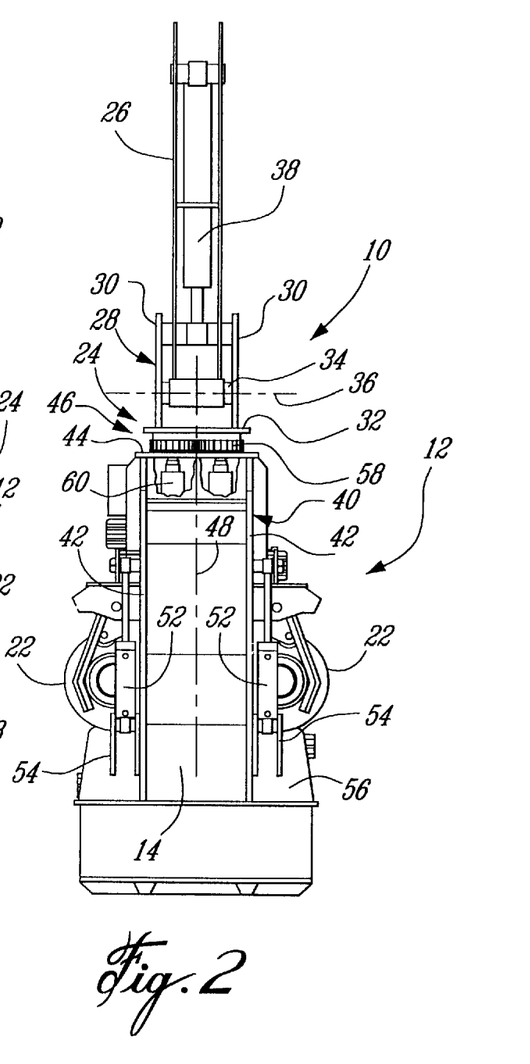
FIG. 2 is a rear elevational view of the embodiment of FIG. 1.

The link system 24 includes a bracket member 28 which includes parallel brackets 30 extending perpendicularly from an end plate 32. A pin 34 (as shown in FIGS. 1 and 2) is attached to the bracket member 28 and extends between the two parallel brackets 30. A free end of the boom 26 is pivotally connected to the pin 34 so that the bracket member 28 is pivotable about the axis 36 of the pin 34, which is generally horizontal. An hydraulic cylinder 38 is provided between the boom 26 and the bracket member 28 for tilting the bracket member 28 about the generally horizontal axis 36.

The link system 24 also includes a generally elongate arm member 40 which includes a pair of parallel arms 42 (not shown in FIG. 1) connected together at the top end thereof by an end plate 44. The end plate 44 of the arm member 40 is rotatably coupled with the end plate 32 of the bracket member 28 to form a rotary coupling 46 by which the arm member 40 is rotatably mounted to the bracket member 28 in order to allow it to rotate about the axis 48 while restraining other movement of the arm member 40 relative to the bracket member 28. The axis 48 is substantially perpendicular to the axis 36.

At the other end of the arm member 40, the two parallel arms 42 are pivotally mounted to the respective sides of the central beam 14 so that the central beam 14 is enabled to pivot about an axis 50 (shown in FIGS. 3–5) which is perpendicular to both the axis 48 and the central beam 14, and extends side to side with respect to the processor head 12. A pair of hydraulic cylinders 52 (not shown in FIG. 1) are pivotally linked between the arm member 40 and the central beam 14, by means of two pairs of parallel brackets 54 (not shown in FIG. 1) affixed to a base part 56 (shown in FIG. 2 only) of the central beam 14. The hydraulic cylinders 52 are provide to actuate the tree processor head 12 in pivotal movement about the axis 50. The rotary coupling 46 further includes a fixed gear 58 co-axially affixed to the end plate 32 of the bracket member 28 and two hydraulic motors 60 (only shown in FIG. 2).

Figure 6:
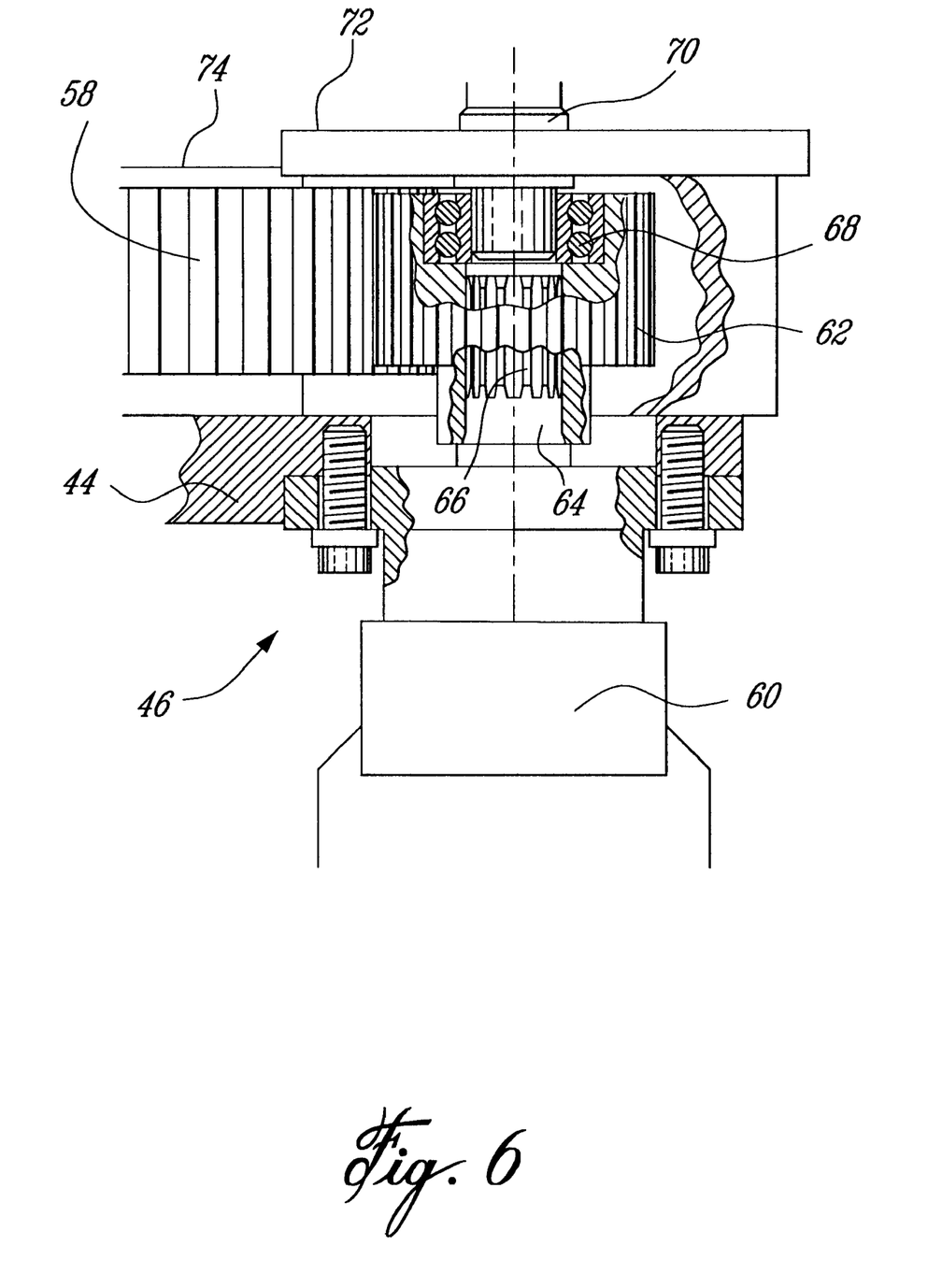
FIG. 6 is an enlarged section of FIG. 2, partially in a cross-sectional view, showing the details of the hydraulic motor powered rotary coupling of the embodiment of FIG. 1.
Figure 7:
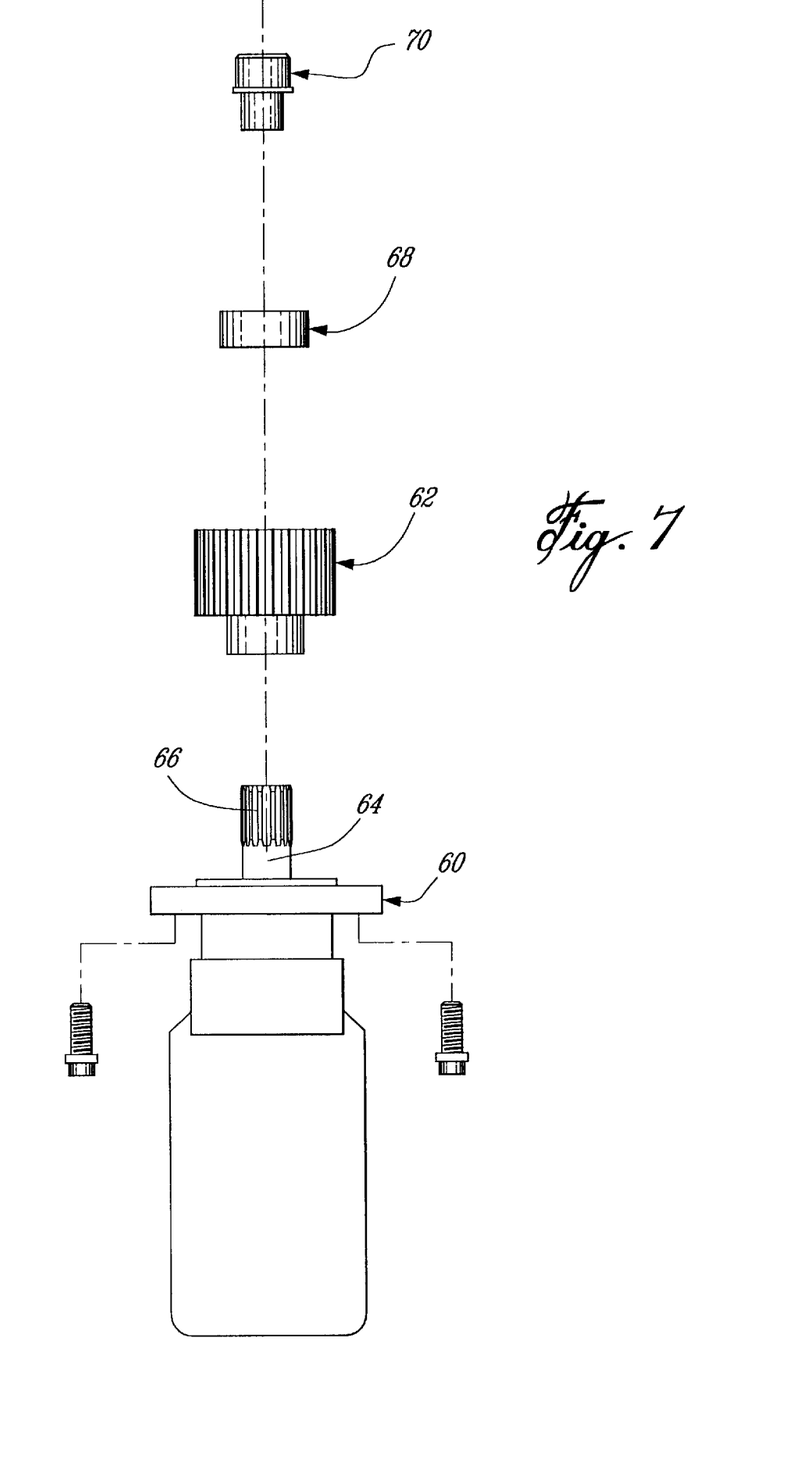
FIG. 7 is an exploded view of a mobile gear connected to the hydraulic motor.

As more clearly shown in FIGS. 6 and 7, each of the hydraulic motors 60 is affixed to the end plate 44 by means of mounting screws. A pinion 62 is engaged with the shaft 64 of the hydraulic motor by means of splines 66 so that the pinion 62 will rotate together with the shaft 64 of the hydraulic motor 60. A bearing 68 and a bearing spigot 70 are used to secure a slewing guide plate 72 to the top side of the pinion 62 so that when the hydraulic motor 60 is actuated to rotate and the pinion 62 thereby rolls along the periphery of the fixed gear 56, the slewing guide plate 72 slides on an annular slewing bearing surface 74 formed on the top side of the fixed gear 58 adjacent to the periphery thereof.

Returning to FIGS. 1 to 4, the rolling action of the pinions 62 around the periphery of the fixed gear S8 provides a continuous rotation of the end plate 44 of the arm member 40, along with the entire tree processor head 12, about the axis 48, relative to the end plate 32 of the bracket member 28. However, the manipulation of the tree felling and shaping apparatus 10 for an angular adjustment of the tree processor head 12 does not require the tree processor head 12 to be rotated about the axis 48 more than 360°, and the hydraulic hoses (not shown) for supplying the pressurized hydraulic fluid to the hydraulic motors 60 and hydraulic cylinders 52 will interfere with the unrestricted rotation of the tree processor head 12 about the axis 48. Therefore, it is suggested that the rotation of the tree processor head 12 about the axis 48 relative to the bracket member 28 should not be more than 360°.

The hydraulic system (not shown) designed for the respective hydraulic cylinders 38, 52 and the hydraulic motors 60 are enabled to controllably actuate the hydraulic cylinders 38, 52 and the hydraulic motors 60 in opposite directions, and hydraulically lock the hydraulic cylinders 38, 52 and hydraulic motors 60 in any position. The hydraulic system is also enabled to withdraw hydraulic pressure which permits the hydraulic cylinders 38, 52 and the hydraulic motors 60 to be selectively free for passive relative movement about the respective axes 35, 48 and 50, for a "floating" linkage, if it is required during a tree felling and shaping operation.

Figures 3, 4:
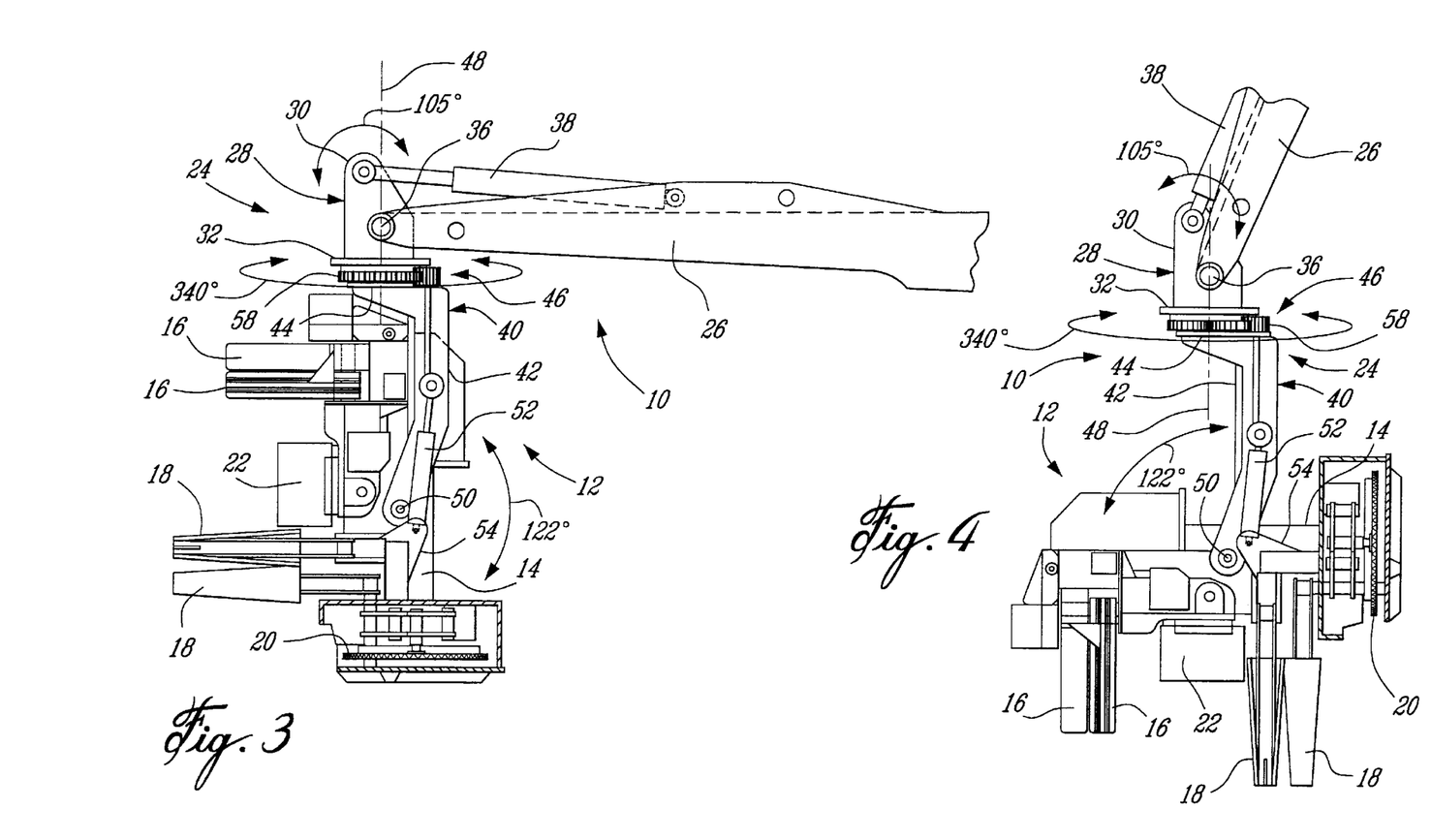
FIG. 3 is a side elevational view of the embodiment of FIG. 1, showing the tree processor head of the tree felling and shaping apparatus in an upright position for a tree felling process.
FIG. 4 is a side elevational view of the embodiment of FIG. 1, showing the tree processor head of the tree felling and shaping apparatus in a recumbent position for a tree shaping process.

More particularly, as shown in FIG. 3, axis 36 and axis 48 in combination define a common plane which is represented in the side view of FIG. 3 by the axis 48 extending through the pivoting point which is the axis 36. Furthermore, the arm member 40 is configured in such a way as to permit the tree processor head 12 to be positioned below the rotary coupling 46 when the axis 48 is substantially vertical and the tree processor head 12 is in an upright position. The axis 48 preferably extends through the gravitational center (not shown) of the tree processor head 12. More preferably, the axis 50 is located at the gravitational center of the tree processor head 12 so that the tree processor head 12 is enabled to be freely suspended from the boom 26 under the force of gravity alone, without locking any one of the hydraulic cylinders 38, 52 regardless of whether the tree processor head 12 is in the upright or recumbent position as illustrated in FIGS. 3 and 4 respectively. Nevertheless, if the axis 50 is in a proximity of the gravitational center of the tree processor head 12 but not accurately located at the gravitational center thereof, the tree processor head 12 is still enabled to freely suspend from the boom 26 without locking the hydraulic cylinder 38. The hydraulic cylinders 52 should however, be hydraulically locked to maintain a selected position of the tree processor head 12 relative to the arm member 40.

Figure 5:
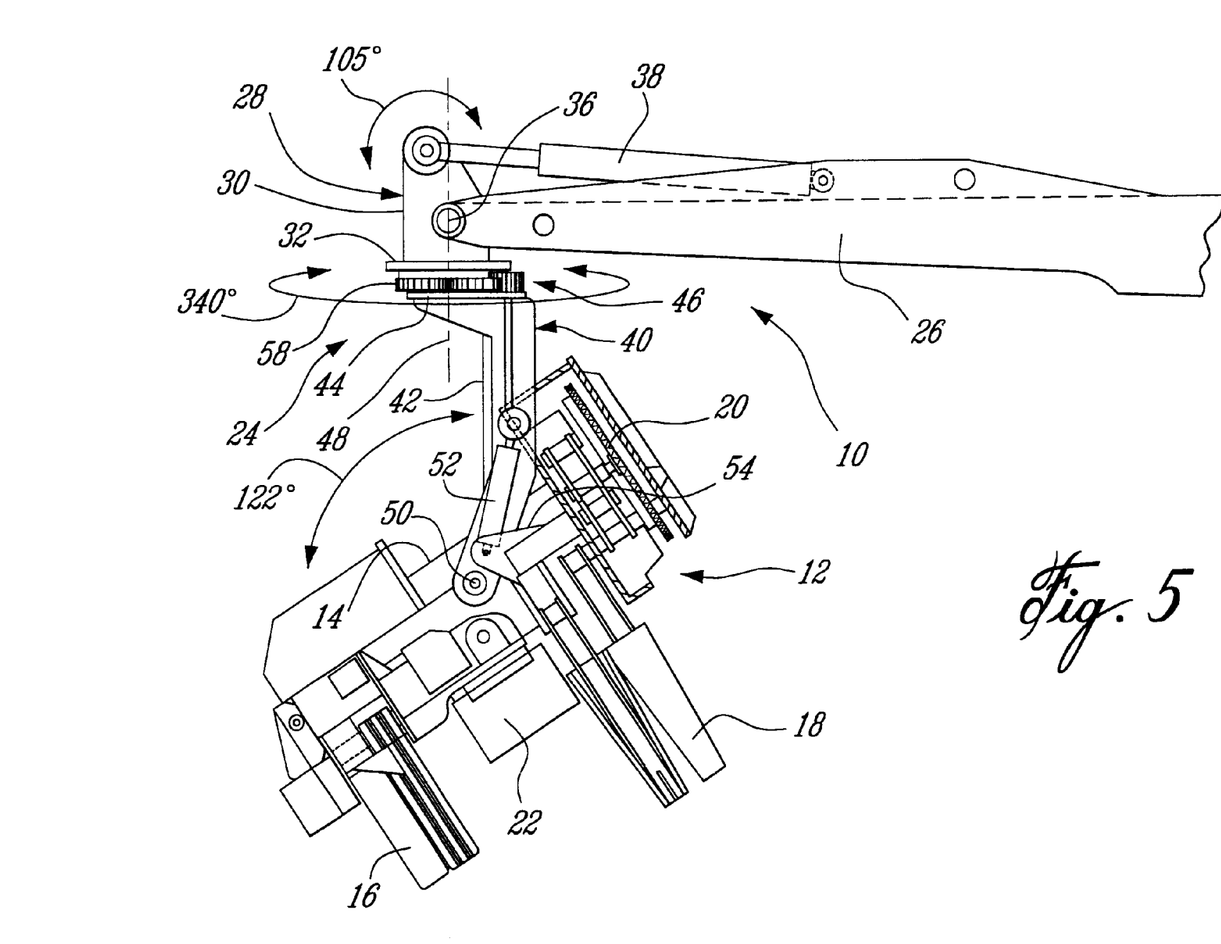
FIG. 5 is a side elevational view of the embodiment of FIG. 1, showing a different pivoting angle of the processor head in its recumbent position for the tree shaping process.

In operation an operator moves the vehicle and the attached boom 26 in order to properly position the tree processor head 12 for an approach to the tree targeted to be felled, while the tree processor head 12 is maintained in its upright position and is freely suspended from the boom 26 as shown in FIG. 3. The rotary coupling 46 is actuated for an angular adjustment of the tree processor head 12, of up to 360° in order to allow selection of a best angle of approach to the target tree. When the rotary coupling 46 rotates the tree processor head 12 to position axis 50 at an angle with respect to axis 36 (not parallel to each other), and if hydraulic cylinders 38 and 52 are not locked, the combination of the free pivotal movement about the respective axes 36, 50 provides a universal joint function. This will permit the tree processor head 12 to be freely aligned with the target tree when the gripping arms 16, 18 grip the tree whether or not the tree is perfectly vertical. The hydraulic cylinders 38, and hydraulic motors 60 (not shown in FIG. 3) are hydraulically locked after the tree is securely gripped by the gripping arms 16, 18. The cut-saw 20 is then actuated to cut the tree. The rotary coupling 36 then is actuated again to select a desired direction within 360° to tilt down the tree, which is done either by actuating the hydraulic cylinders 52 to pivot the tree processor head 12 with the gripped tree to the recumbent position, as shown in FIG. 4, or by simply dropping the hydraulic pressure in hydraulic cylinders 52 thereby permitting the tree to freely pivot to the recumbent position. In the shaping, de-limbing and piling operation the rollers 22 are actuated to feed the tree through the tree processor head 12 along its longitudinal length. The unlocked cylinders 52 permit the tree processor head 12 to swivel freely about the axis 50 while the tree moves through the tree processor head 12 in response to changes in the gravitational center of the combination of the tree and the tree processor head 12. A swiveled position of the tree processor head 12 is shown in FIG. 5. At the end of the tree shaping operation, the tree is cut into selected lengths.

The tree processor head 12 in its recumbent position as shown in FIG. 4, can also be used for handling and piling the tree lengths if it is required.

With such a fully powered and controllable link system, the selective control of hydraulic cylinders 38, 52 and hydraulic motors 60 for actuating, locking the cylinders and motors, or withdrawing the hydraulic pressure in the hydraulic cylinders and motors, provides a great convenience for the manipulation of the tree felling and shaping apparatus 10. The combination of two pivoting joints about the respective axes 36, 48 with a rotary coupling 46 disposed therebetween in the link system 24 not only advantageously provides a maximum angular adjustment of the tree processor head 10 for all directional orientations but also performs a universal joint function to freely suspend the tree processor head 12 from the boom without using an conventional uncontrollable universal joint which is usually used in prior art tree felling and shaping apparatuses.

Changes and modifications to the embodiment of the present invention described above may be made without departing from the spirit and the scope of the present invention which are intended to be limited only by the scope of the appended claims.

I claim:

1. A fully powered and controllable link system for operatively linking a boom and a tree processor, the tree processor including a central elongate support member, and generally having an upright position in which the central elongate support member is substantially vertical for felling a tree, and a recumbent position in which the central elongate support member is substantially horizontal for shaping the tree, the link system comprising:

a first member adapted to be pivotally mounted to a free end of the boom for pivoting about a first generally horizontal axis; a first axis power actuator attached to the first member and adapted to be connected to the boom for tilting the first member about the first axis;

a generally elongate second member mounted at a first end thereof to the first member directly by a rotary coupling, permitting the second member to rotate more than 300°, but restraining other movement thereof, relative to the first member about a second axis which is perpendicular to the first axis, regardless of the upright or recumbent processor head position;

a second axis power actuator attached to the rotary coupling for actuating the rotary movement;

the second member at a second end thereof being adapted to be pivotally mounted to the central elongate support member of the processor head for pivoting about a third axis which is perpendicular to the second axis and is adapted to extend side to side with respect to the processor head as well as adapted to be perpendicular to the central elongate support member of the processor head; and a third axis power actuator attached to the second member and adapted to be connected to the central elongate support member for pivoting the central elongate support member about the third axis between the upright and recumbent positions.

2. The link system as claimed in claim 1 wherein the second axis power actuator comprises a hydraulic motor secured to a second part of the rotary coupling which is affixed to the second member, controllably driving mobile pinion rolling along a periphery of gear co-axial with second axis and secured to a first part of the rotary coupling which is affixed to the first member.

3. The link system as claimed in claim 1 wherein the first axis and the second axis define a common plane.

4. The link system as claimed in claim 1 wherein the third axis is adapted to extend through a gravity centre of the processor head.

5. The link system as claimed in claim 1 is adapted to position the processor head below the rotary coupling regardless of processor head positions relative to the second member.

6. A tree felling and shaping apparatus comprising:

a tree processor head including a central elongate support member, a cutting device at a bottom of the central elongate support member, grapple and stripping means attached to the central elongate support member, the processor head generally having an upright position in which the central elongate support member is substantially vertical for felling a tree, and a recumbent position in which the central elongate support member is substantially horizontal for shaping the tree;

a boom having an end adapted to be mounted to a vehicle and having a free end;

a first member pivotally mounted to the free end of the boom for pivoting about a first generally horizontal axis;

a first axis power actuator positioned to link the boom and the first member for tilting the first member about the generally horizontal axis;

a generally elongate second member mounted at a first end thereof to the first member directly by a rotary coupling, permitting the second member to rotate more than 300°, but restraining other movement thereof, relative to the first member about a second axis which is perpendicular to the first axis, regardless of the upright or recumbent processor head position;

a second axis power actuator attached to the rotary coupling for actuating the rotary movement;

the central elongate support member being pivotally mounted to a second end of the second member for pivoting about a third axis which is perpendicular to both the second axis and the central elongate support member of the processor head, extending side to side with respect to the processor head; and a third axis power actuator positioned to link the second member and the central elongate support member for pivoting the central elongate support member about the third axis between the upright and recumbent positions.

7. The apparatus as claimed in claim 1 wherein the rotary coupling is adapted to permit the second member to rotate 360° relative to the first member, about the second axis regardless of the first or second processor head position.

8. The apparatus as claimed in claim 1 wherein the generally elongate second member comprises a configuration permitting the processor head to be located below the rotary coupling when the central elongate support member thereof is in the upright position.

9. The apparatus as claimed in claim 1 wherein the pivotal and rotary links of the apparatus are arranged in a manner such that the first member with all parts supported thereby, is adapted to freely suspend from the boom under the gravity thereof when the processor head without a load, is maintained in the upright position.

10. The apparatus as claimed in claim 4 wherein the first axis and the second axis define a common plane.

11. The apparatus as claimed in claim 1 wherein the first member comprises a pair of parallel brackets extending perpendicularly from a plate which forms a part of the rotary coupling, and a pin extending between the brackets for pivotally connecting the brackets to the boom.

12. The apparatus as claimed in claim 6 wherein the second member comprises a pair of parallel arms connected together at one end thereof by an end plate which forms a part of the rotary coupling and is rotatably coupled to the plate of the first member, the arms being pivotally mounted at the other end thereof to respective sides of the central elongate support member.

13. The apparatus as claimed in claim 7 wherein the second axis power actuator comprises at least one hydraulic motor to actuate the relative rotation between the plates of the respective first and second members through gears.

* * * * *